United States Patent [19]
Durand et al.

[11] Patent Number: 5,357,358
[45] Date of Patent: Oct. 18, 1994

[54] NEMATIC LIQUID CRYSTAL DISPLAY WITH SURFACE BISTABILITY AND CONTROL BY FLEXOELECTRIC EFFECT

[75] Inventors: Georges Durand, Orsay; Riccardo Barberi, Gif sur Yvette, both of France; Michelle Giocondo, Arcavacata di Rende, Italy; Philippe R. Martinot Lagarde, Marcoussis, France

[73] Assignee: Centre National de la Recherche Scientifique (CNRS), Paris, France

[21] Appl. No.: 966,026
[22] PCT Filed: Jun. 21, 1991
[86] PCT No.: PCT/FR91/00496
§ 371 Date: Feb. 11, 1993
§ 102(e) Date: Feb. 11, 1993
[87] PCT Pub. No.: WO92/00546
PCT Pub. Date: Jan. 9, 1992

[30] Foreign Application Priority Data
Jun. 22, 1990 [FR] France .................. 90 07847
Sep. 19, 1990 [FR] France .................. 90 11548

[51] Int. Cl.⁵ .............. G02F 1/1337; G02F 1/137; G02F 1/13
[52] U.S. Cl. ........................ 359/76; 359/75; 359/84; 359/102
[58] Field of Search ............. 359/102, 76, 75, 84

[56] References Cited

U.S. PATENT DOCUMENTS 4,564,266  1/1986  Durand et al. ............. 359/102
4,701,026  10/1987 Yazaki et al. ............... 359/56
4,904,064  2/1990  Lagerwall et al. ............ 359/56
4,917,475  4/1990  Meyer et al. ................ 359/102

FOREIGN PATENT DOCUMENTS 0281341  9/1988  European Pat. Off. .
0337780  10/1989 European Pat. Off. .
0352792  1/1990  European Pat. Off. .
89/01680  2/1989  World Int. Prop. O. .
89/05993  6/1989  World Int. Prop. O. .

OTHER PUBLICATIONS

Strigazzi, "Second order elasticity and critical thickness of hybrid aligned nematics strongly anchored on the planar side," Mol. Cryst. Liq. Cryst. vol. 179 (1990), pp. 425–433.

Primary Examiner—Anita P. Gross
Attorney, Agent, or Firm—Blakely, Sokoloff, Taylor & Zafman

[57] ABSTRACT

A bistable liquid crystal optical device includes two transparent plates (12, 14) provided with control electrodes (18, 19), between which is placed a nematic liquid crystal material (20). The transparent plates (12, 14) are surface-treated so as to define two stable configurations of molecules of the liquid crystal material generating respectively two flexoelectrical polarizations having components which are normal to electrodes $P_z1P_z2$ having opposite directions. Devices (30) are provided for applying perpendicular electrical field pulses to the plates (12, 14), said pulses being directed selectively one way or the other.

42 Claims, 6 Drawing Sheets

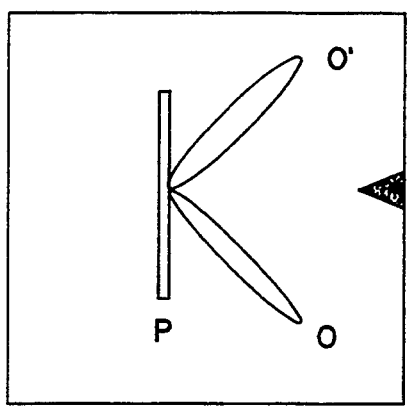
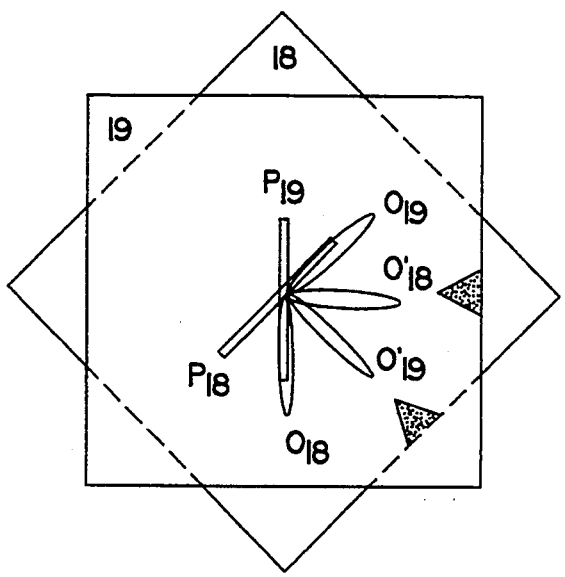
FIG. 5A  FIG. 5B
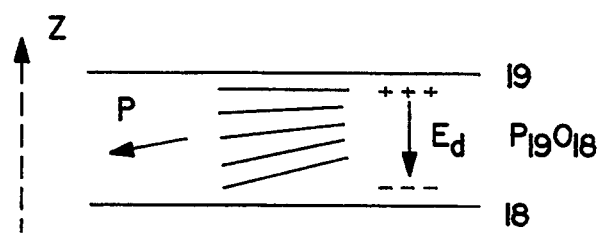
FIG. 6A
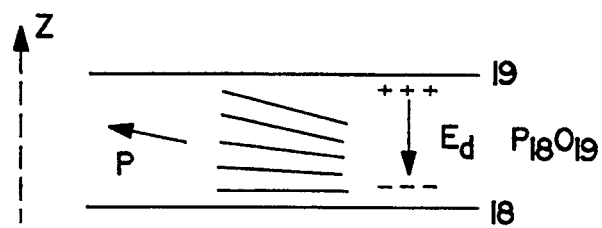
FIG. 6B

| INITIAL STATE | FINAL STATE | |
|---|---|---|
| | $v > 0$ | $v < 0$ |
| A | → B ($|v| < v_s(\tau')$ AND $v > 0$)<br>→ A ($|v| > v_s(\tau')$) | → B |
| B | → A | → A ($|v| < v_s(\tau')$ AND $v > 0$)<br>→ B ($|v| > v_s(\tau')$) |

NEMATIC LIQUID CRYSTAL DISPLAY WITH SURFACE BISTABILITY AND CONTROL BY FLEXOELECTRIC EFFECT

BACKGROUND OF THE INVENTION

The present invention relates to the field liquid crystal optical devices.

The present invention was made at the Laboratoire de Physique des Solides (Solid-State Physics Laboratory) of the Université de Paris Sud (University of Paris South), which laboratory is associated with the CENTRE NATIONAL DE LA RECHERCHE SCIENTIFIQUE (NATIONAL CENTER FOR SCIENTIFIC RESEARCH) number 04 0002.

Much research worked,has been conducted for at least the last fifteen years or so on liquid crystals.

Various results of the research work carried out at the Laboratoire de Physique des Solides de l'Université Paris Sud are described in the French Patent Application filed on Apr. 28, 1982 under the No. 82 07309 and published under the No. 2 526 177, the French Patent Application filed on Oct. 23, 1984 under the No. 84 16192 and published under the No. 2 572 210, the French Patent Application filed on Jun. 18, 1985 under the No. 85 09224 and published under the No. 2 587 506, the French Patent Application filed on May 14, 1986 under the No. 86 06916 and published under the No. 2 598 827 or again the French Patent Application filed on Dec. 17, 1987 under the No. 87 17660 and published under the No. 2 624 985.

Moreover, the work relating to liquid crystals has given rise to numerous publications.

The present invention more precisely relates to the liquid crystal optical devices which are called bistable, that is to say devices in which the molecules of the liquid crystals can alternately occupy two stable states, under the effect of external control. Such bistable optical devices are suitable in particular for producing multiplexed displays.

Various liquid crystal bistable optical devices have already been proposed.

The document Applied Physic [sic] Letters 40 (12) 1007 (1982) J. Cheng et al. describes, for example, a nematic liquid crystal device having two states exhibiting bulk stability switched by an external command electric field. The process described in this document has not given rise to a practical application. It has a very slow commutation time and generally exhibits numerous textural defects.

The document Applied Physic [sic] Letters 36, 899 (1980), N. A. Clark et al. describes another bistable optical device using liquid crystals called Smectic C* ferroelectric, and degenerate surface anchorings. The process described in this document has the advantage of a very short switching time and has given rise to practical applications. It is not however completely satisfactory.

In particular, in practice, it is frequently noticed that instead of a display arrangement which is bistable between two symmetric states, display arrangements which are monostable on twisted textures whose contrast is poor and which cannot be multiplexed are obtained. This phenomenon seems to be due to the fact that the electrode/liquid crystal interface is polar.

The document Applied Physic [sic] Letters Dec. 11, 1989, R. Barberi, M. Boix and G. Durand describes another bistable optical device in which the bistability is induced by a controlled toughening treatment on at least one of the transparent electrodes and the switching is operated by application of an external electric field parallel to the electrodes. According to this document, the toughening treatment may be obtained, for example, by oblique evaporation of SiO. This Applied Physic [sic] Letter [sic] document is to be linked with the aforementioned French Patent Application No. 87 17660.

The process described in the document Applied Physics Letters Dec. 11, 1989 seems promising. The specialists have, however, always hitherto considered that this process has the major drawback of being sensitive only to an electric field parallel to the transparent plates of the device and of being completely insensitive to an electric field perpendicular to the plates.

Another type of nematic bistable display using the bistability of surface orientation states, in which the switching controlled by electric pulses of defined polarity is based on the use of chiral ions, is described in the French Patent Application filed on Jan. 30, 1990 under the No. 90 01066.

SUMMARY OF THE INVENTION

The aim of the present invention is now to provide a novel liquid crystal bistable optical device having better performances than the prior art.

An important aim of the present invention is to provide a liquid crystal bistable optical device with rapid switching, in particular for producing highresolution multiplexed optical matrices.

Another important aim of the present invention is to provide a liquid crystal bistable optical device designed in order to be controlled easily by an external electric field.

These aims are achieved according to the present invention by virtue of a bistable-effect liquid crystal optical device of the type comprising two transparent plates provided with control electrodes and between which there is placed a nematic liquid crystal material, characterized in that:

the transparent plates have a surface treatment capable of defining two stable configurations of liquid crystal material molecules respectively generating two flexoelectric polarizations having components normal to the electrodes of opposite directions, and there are provided electrical supply means capable of applying to the device pulses of electric field perpendicular to the plates, oriented selectively in one direction or the other.

The alternate application of electric-field pulses normal to the plates, oriented in one direction then in the other, makes it possible to switch the structure of the liquid crystal between the two stable configurations.

The effect of the control electric field will be specified in the rest of the description.

According to another advantageous characteristic of the present invention, the device comprises electrical supply means designed in order to apply to the device in succession:

at least one command pulse capable of inducing a generally homeotropic homogeneous orientation of the liquid crystal, then a control pulse, of amplitude less than the command pulse, and of polarity chosen according to the required final state.

As will be explained in what follows, the command pulse may be the subject of several variants. It is moreover of any polarity.

The use of command pulses and control pulses allows, in particular, simple control by multiplexing of a bistable nematic display.

For this purpose, according to an advantageous characteristic of the present invention, the optical device, in which the control electrodes are arranged in N lines and M columns defining a matrix of NM pixels at their intersections, is characterized in that the command pulses are applied successively on the N line electrodes, while at the end of each command pulse, control pulses of respectively chosen polarity are applied simultaneously on the whole of the M column electrodes.

The pulses necessary for the multiplexing of the liquid crystal device are thus much simpler than those used in the past, in particular for the multiplexing of the C* ferroelectric smectics.

Examples of command signals hitherto proposed for the C* ferroelectric smectics are described in the following documents: 1) J. M. Geary, Proceedings of SID'85, pp. 128-130 (1985), 2) S. T. Lagerwall, J. Wahl and N. A. Clarck, Proceedings of International Display Research Conference, Ferroelectric Liquid Crystals for Displays, pp. 213-220 (1985), 3) S. Shimoda, K. Ito, T. Harada, M. Taguchi, K. Iwara, M. Kai, Proceedings of Japan Display '86, pp. 460-462 (1986).

According to the present invention, the command pulse may be a single square pulse, comprise two successive square pulses of polarity which are opposite or alternatively comprise a high-frequency pulse train.

According to another advantageous characteristic of the present invention, the amplitude of the command pulses is between 1 and 100 volts, typically between 10 and 20 volts, whereas the duration of the command pulses is greater than 1 $\mu$s, typically between 20 and 50 $\mu$s.

According to another advantageous characteristic of the present invention, the amplitude of the control pulses is between 0.1 and 10 volts, typically between 0.1 and 5 volts, whereas the duration of the control pulses is greater than 10 $\mu$s, typically between 25 and 50 $\mu$s.

The start of the control pulses may coincide with the end of the command pulses.

In a variant, the start of the control pulses may precede the end of the command pulses.

It is advantageous for the control pulses to persist after the end of the command pulses for at least 10 to 50 $\mu$s.

BRIEF DESCRIPTION OF THE DRAWINGS

Other characteristics, aims and advantages of the present invention will emerge on reading the detailed description which is to follow and on considering the attached drawings which are given by way of non-limiting examples and in which:

FIG. 5A represents a zenithal view of the orientations of an electrode seen through the liquid crystal, FIG. 5B represents the relative orientation of two electrodes turned through a relative azimuthal angle of the order of 45°, FIGS. 6A and 6B represent two different stable configurations of liquid crystal material having flexoelectric polarizations of components normal to the electrodes of opposite direction.

DESCRIPTION OF THE PREFERRED EMBODIMENTS

General Structure of the Device

Figure 1:
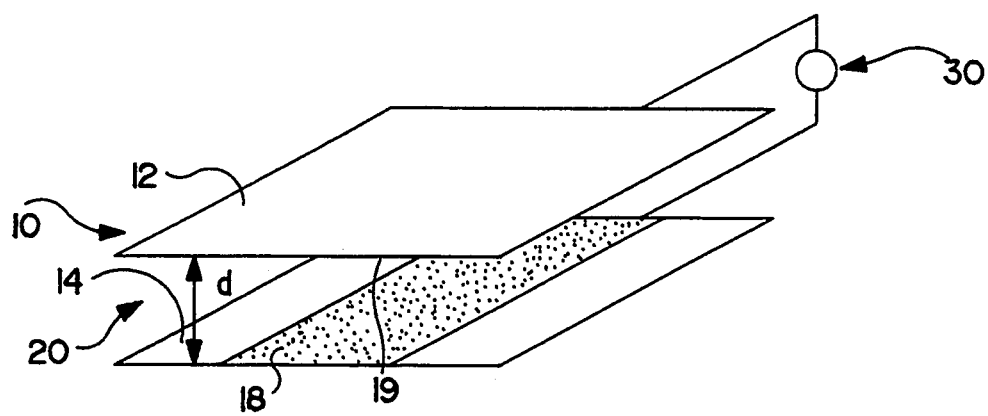
FIG. 1 represents a general schematic view of an optical device according to the present invention, FIG. 2 diagrammatically illustrates the two stable configurations of the molecules.

The known basic structure of the optical device used comprises, as diagrammatically represented in the attached FIG. 1, a cell 10 formed by two parallel transparent plates 12, 14, for example made of glass, separated by a wedge of constant thickness d (not represented in FIG. 1) and between which there is placed a nematic liquid crystal material 20.

The plates 12, 14 are provided on their facing internal surfaces, which are adjacent to the liquid crystal, with electrically conducting and optically transparent electrodes. Such an electrode is represented diagrammatically in the form of a band 18, for the plate 14, in FIG. 1. The similar electrode provided on the plate 12 is labeled 19.

Electrical supply means 30 are connected between the electrodes provided on the two plates 12, 14 in order to apply a controlled electric field onto the liquid crystal material 20. These electrical supply means 30 are advantageously designed in order to deliver electric pulses of a duration between 1 and 1000 $\mu$s and of amplitude between 1 and 100 volt, alternately with opposite polarities.

Essential Characteristics of the Invention

More precisely, the optical device according to the present invention has two essential characteristics:

the two transparent plates 12, 14 have a surface treatment capable of defining two stable configurations of liquid crystal material molecules respectively generating two flexoelectric polarizations having components normal to the electrodes of opposite directions, and electrical supply means 30 are coupled to the electrodes 18, 19 so as to apply to the device pulses of electric field perpendicular to the plates, oriented alternately in one direction and then in the other.

The two stable configurations of the molecules of the liquid crystal material correspond to two orientations of the molecules in planes orthogonal to the plates 12, 14 and have between them an azimuthal inclination of the order of 45°, so that when observed between analyzers and polarizers which are crossed, the cell thus formed appear [sic] alternately in the bright or dark state according to the configuration occupied by the molecules of the liquid crystal material.

Various appropriate types of surface treatment will be described in what follows.

According to another advantageous characteristic of the present invention, the nematic liquid crystal used has a positive dielectric anisotropy.

Figure 2:
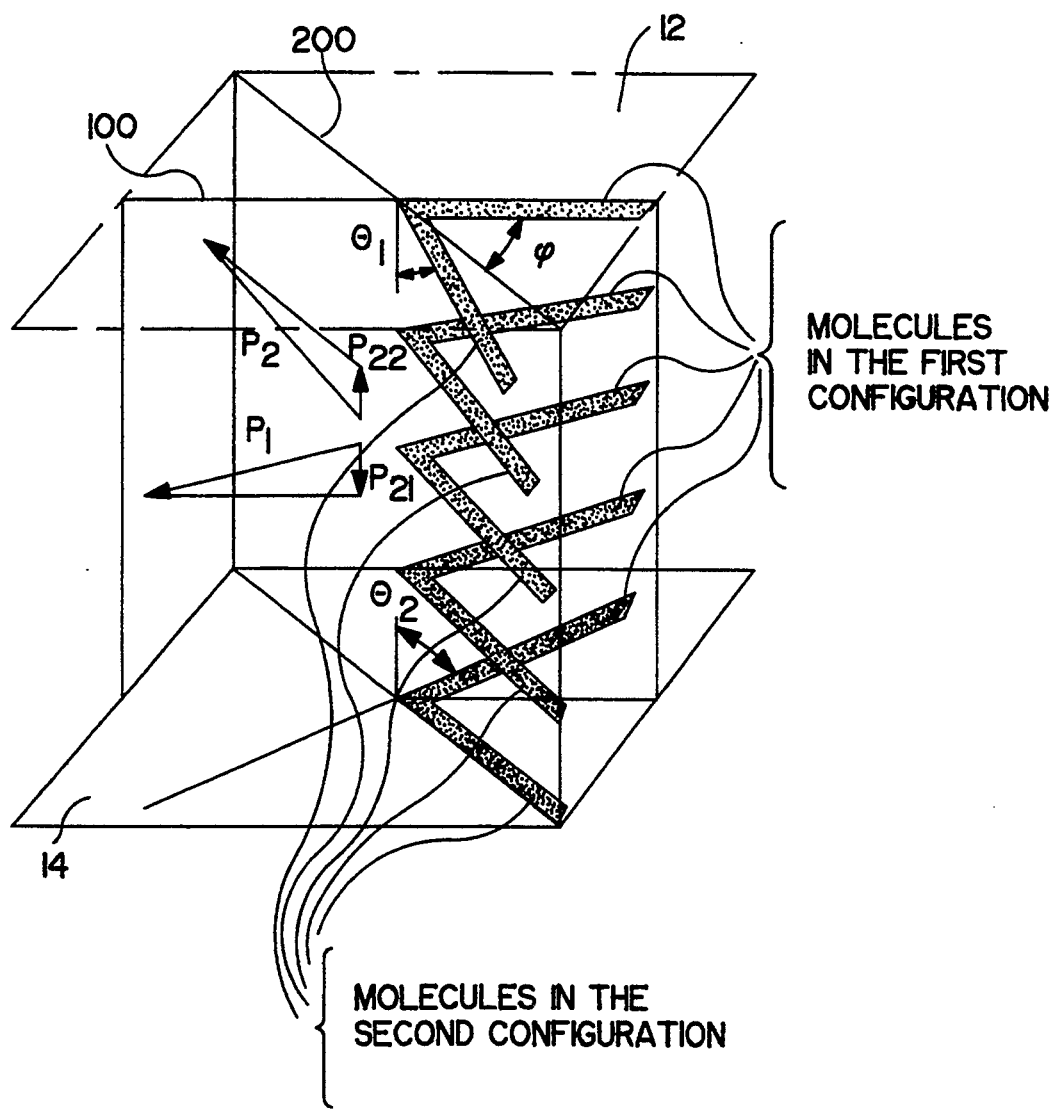

Two stable configurations of the molecules of the liquid crystal material generating opposite flexoelectric polarizations have been represented diagrammatically in the attached FIG. 2.

In the attached FIG. 2 are again found the two transparent plates 12, 14 between which there is placed the nematic liquid crystal material 20.

When the molecules of the liquid crystal material 20 are placed in a first stable configuration, they are oriented along planes parallel to the plane labeled 100 in FIG. 2. The plane 100 is orthogonal to the plates 12, 14. In this first configuration, the molecules of the liquid crystal progressively pass from an orientation which is planar on the upper plate 12, that is to say parallel to this plate 12, to an orientation which is oblique, with zenithal angle $\theta_1$, on the lower plate 14.

When the molecules of the liquid crystal material 20 are placed in the second stable configuration, they are oriented along planes parallel to the plane labeled 20 in FIG. 2. The plane 200 is orthogonal to the plates 12, 14. It has an azimuthal inclination $\phi$ of the order of 45° with respect to the aforementioned plane 100.

In the second configuration, the molecules of the liquid crystal 20 progressively pass from an orientation which is planar on the lower plate 14, that is to say parallel to this plate 14, to an orientation which is oblique, with zenithal angle $\theta_2$, on the upper plate 12.

These two stable configurations generate flexoelectric polarizations P1, P2 whose components Pz1, Pz2 normal to the electrodes are opposite, directed respectively toward the lower plate 14 in the first configuration and toward the upper plate 12 in the second configuration.

Operation

When a voltage is applied between the electrodes 18, 19 provided on the plates 12, 14, the molecules of the liquid crystal orientate themselves perpendicularly to the said plates because of their positive dielectric anisotropy.

If the electrical excitation of the cell corresponds to a negative pulse on the upper electrode, at the end of the pulse, there remain near the upper electrode 19 positive ions and near the lower electrode 18 negative ions which apply a depolarizing and transient electric field directed from the upper electrode 19 toward the lower electrode 18. The field promotes the creation of the first configuration which has a flexoelectric polarization component Pz1 also directed from the upper electrode 19 toward the lower electrode 18.

After the relaxation time of the charges, the depolarizing field disappears and the first configuration is stable.

When the cell thus formed is observed between analyzers and polarizers which are crossed, the direction of the analyzer or of the polarizer being parallel to the plane 100, the cell appears black in the first configuration.

If a positive pulse is then applied to the cell, the molecules align themselves perpendicularly to the plates 12, 14 during the pulse. At the end of this pulse, there remain near the upper electrode 19 negative ions and near the lower electrode 18 positive ions which apply a depolarizing and transient electric field directed from the lower electrode 18 toward the upper electrode 19.

This field promotes the creation of the second configuration which has a flexoelectric polarization component Pz2 directed toward the upper electrode 19.

After the relaxation time of the charges, the depolarizing field disappears and the second configuration is stable.

The cell then appears bright.

In order to pass back into the first configuration, it is sufficient to apply a negative pulse to the cell.

Surface Treatment

As previously indicated, various types of surface treatment may be used in the scope of the present invention in order to control the various configurations required.

This surface treatment may be formed, for example, from the deposition of a polymer on the internal facing surfaces of the plates 12, 14 followed by two abrasions of the polymer which are inclined to each other, and according to methods known to the person skilled in the art in order to impose the desired obliqueness of the molecules on the plates.

According to another variant, the surface treatment may be formed by controlling the roughness of the surface of the plates 12, 14 (control of the thickness of the roughness and of its mean incidence or mean wavelength) as taught in French Patent Application No. 87 17660 published under No. 2 624 985.

Particular Embodiment

The structure and operation of a particular embodiment of the device according to the present invention will now be described.

I—DESCRIPTION OF THE DISPLAY a) Material

A nematic liquid crystal is used, for example 5CB, of dielectric anisotropy $\epsilon_a = \epsilon_\| - \epsilon_\perp > 0$ ($\epsilon_a$ is typically of the order of 10). This liquid crystal may be doped with non-chiral ions of suitable concentration and with a cholesteric, as will be specified in what follows. This nematic is placed in a cell whose two ITO electrodes are treated in order to give bistable surface states.

b) Textures Used

Surface multistable orientation states are created by an evaporation of SiO at an angle of 74°, of low mean thickness $\sigma(\sigma, \simeq 30$ Å). Preliminary experiments have shown that in these conditions, the stable molecular orientation state is a planar state P (molecules parallel to the electrode, and perpendicular to the direction of evaporation as represented in FIG. 3), but there also exist two oblique metastable states (O, O') of zenithal angle $\theta \simeq 75°$ and of azimuth $\phi = \pm 45$ with respect to the direction of evaporation (see FIG. 3).

Figure 3:
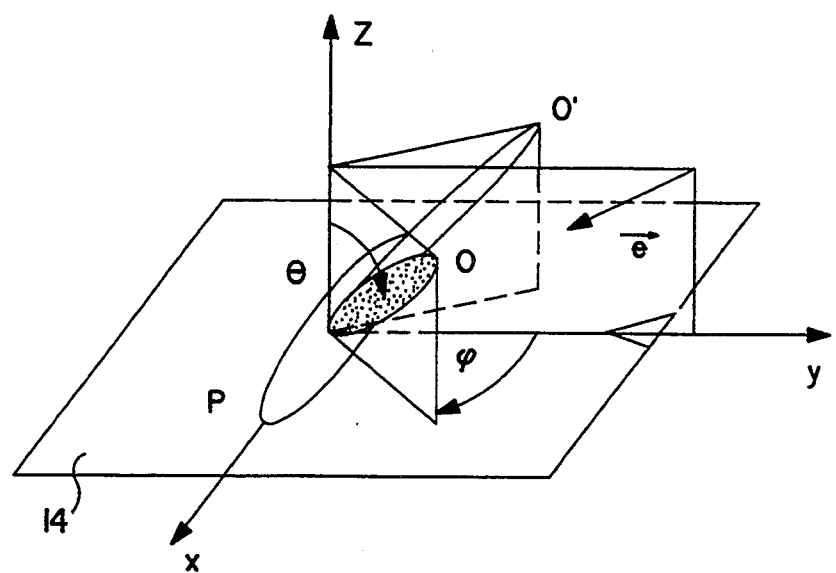
FIG. 3 represents the orientation states of multistable surfaces created by an oblique evaporation of directions e, for example of SiO, in FIG. 3, P designates a planar stable orientation, O O' two oblique metastable orientations, [lacuna] a zenithal angle and [lacuna] an azimuthal angle.

In the attached FIG. 3, the direction of evaporation is labeled e.

With respect to the publication "M. Monkade, M. Boix, G. Durand, Order electricity and oblique nematic orientation on rough solid surfaces, Europhys. Lett., 5, 697 (1988)", a situation Just below the degenerate planar/oblique transition zone is found.

Figure 4:
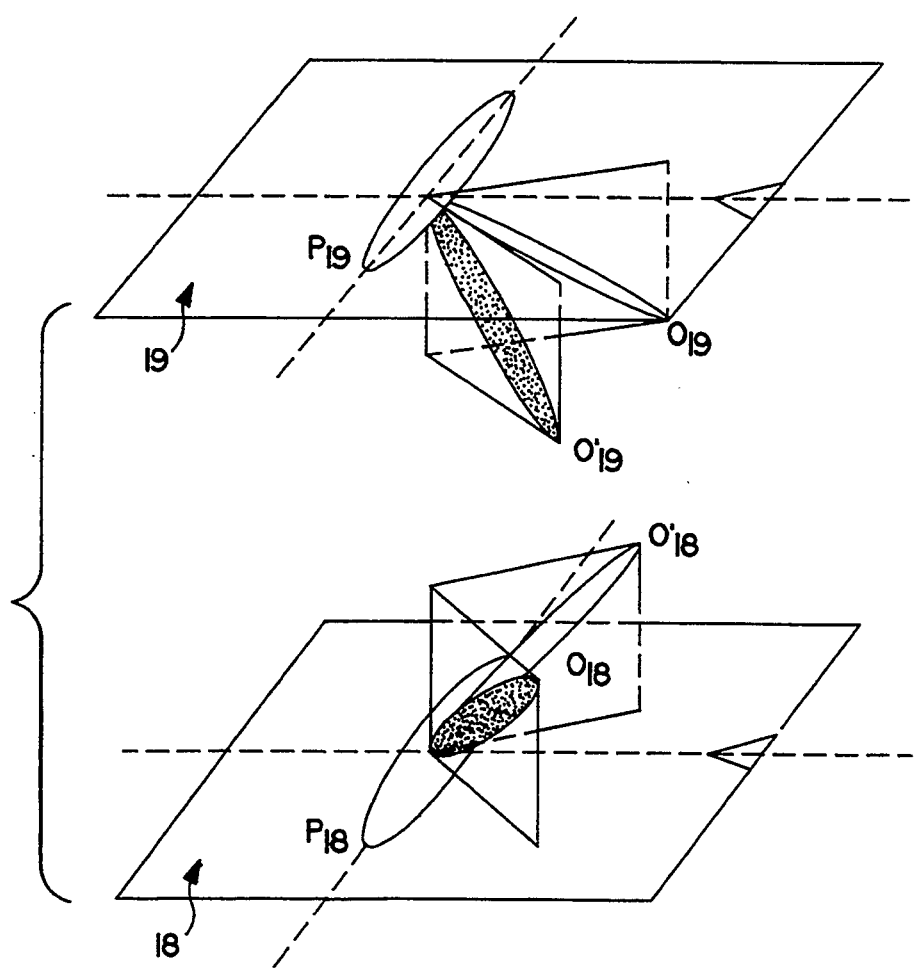
FIG. 4 represents a perspective view of two electrodes having coplanar evaporation directions.

FIG. 4 represents in perspective the three surface states thus produced, one planar stable P and two oblique metastable O and O' on each of the two plates, in the case of evaporation direction [sic] which are coplanar. The two electrodes 19 (top) and 18 (bottom) represented in FIG. 4 are identical.

FIG. 5A represents a zenithal view of the orientations of an electrode seen through the liquid crystal.

As represented in FIG. 5B, the two electrodes are subjected to a relative rotation of 45° about an axis z which is normal to them.

The two textures of constant azimuth defined by the states $P_{19}O_{18}$ and $O_{19}P_{18}$ are used for the optical switching.

The aforementioned arrangement of the electrodes 18, 19 is defined by starting from the symmetric situation in which the evaporation directions are coplanar and the electrodes are facing, as represented in FIG. 4. One electrode (for example the electrode 19) is then rotated by $\phi_0 = 45°$ so that the azimuths of the directions $O_{19}$ and $P_{18}$ coincide, as well as those of $P_{19}O_{18}$. The direction $O_{19}P_{18}$ is then rotated by 45° with respect to $O_{18}P_{19}$. In addition to these two textures of constant azimuth, there exist of course other textures of variable azimuth, which are therefore twisted, for example $O_{19}P_{18}$, $P_{19}P_{18}$, etc. The arrangement chosen is that for which these other textures have the highest distortion energy, involving at the same time a change in azimuth $\phi$ and in zenithal angle $\theta$. These high distortion energies make these textures unstable. There nevertheless exists a texture of single twist $\phi_0$ between the states $P_{19}$ and $P_{18}$. In order to raise the energy of this state, it is possible to dope the nematic with a cholesteric so that over the thickness d of the cell, the cholesteric-doped nematic rotates spontaneously in the opposite direction by an angle $-\phi_0/2 \simeq 20°$. This greatly increases the twist energy of the texture $P_{19}P_{18}$, but without overly decreasing the energy of the undesired textures of type $O_{19}O_{18}$, etc. The twist $-\phi_0/2 = 20°$ is obtained by fixing the concentration of a cholesteric dopant. The Merck C15 cholesteric molecule has been used. For this body, at room temperature, the product: cholesteric pitch × concentration in 5CB is equal to 2 μm. In order to obtain 20° over the thickness d, a cholesteric pitch $\simeq 18d$ is necessary, which fixes the concentration.

In conclusion, two bulk textures have thus been produced of constant azimuth rotated by 45° with respect to each other, while eliminating all the others of too high curvature energy. These two states have spontaneous flexoelectric polarizations $P = e[n(\mathrm{div} n) + \mathrm{rot} n \times n]$ (e, flexoconstant, $\simeq 10^{-4}$ cgs) whose components normal to the electrodes are of opposite directions. The flexoelectric polarizations are therefore opposite with respect to the direction of the electric field applied as represented in FIGS. 6A and 6B. This polar property will be used for the electrical switching between the two states.

c) Optical Assembly

The two textures $O_{19}P_{18}$ and $P_{19}O_{18}$ are placed between analyzers and polarizers which are crossed. The texture $O_{18}P_{19}$ is parallel to one of the directions of the analyzer or of the polarizer, and corresponds to a state which is extinct (black) in transmission. The other texture $P_{18}O_{19}$ is oriented at 45°. It restores the light if the resulting birefringence corresponds to an optical delay of a multiple of $\lambda/2$ ($\lambda \simeq 0.5$ μm is the optical wavelength).

With a surface zenithal angle $\theta$ between 90° (for P) and 75° (for O), the mean birefringence, corresponding to the mean angle $\theta m \simeq (90+75)/2 \simeq 82°$, is equal to: $\Delta n = \Delta n 0 \sin^2 \theta m \simeq 0.19$ with $\Delta n 0 \simeq 0.2$. The optimal thickness $d_o$ defined by: $d \Delta n = \lambda/2$, gives:

$$d_o = (0.25/0.19) = 1.3 \text{ μm}.$$

In practice, in the experiment conducted by the inventors, d is fixed to 1 μm by wedges of parylene C of the company Comelec. The two ITO electrodes are held in a sample holder, in order to press correctly on the wedges.

II—DESCRIPTION OF THE OPERATION a) Optical Observation

The pixel thus produced is observed under a Leitz polarizing microscope, whose polarizers are disposed as indicated hereinabove in Ic. The light transmitted is also observed by a photomultiplier and recorded on a storage oscilloscope.

The two electrodes are connected to a generator of a rectangular pulse, of duration $\tau(1 \text{ μs} < \tau < 1 \text{ ms})$ and of constant amplitude $V(-200 < V < +200 \text{ volt})$. The ground is connected to the electrode 18. In the absence of electrical excitation, one state $O_{19}P_{18}$ or $P_{19}O_{18}$ (or both states) is observed at random. A positive pulse, of duration $\tau = 100$ μs, is applied. Below a threshold of $V = +14$ volt, a single bright state $O_{19}P_{18}$ is made to appear after the pulse. Another positive pulse does not change the state. A negative pulse, $V = -14$ volt, is then applied which flips the state $O_{19}P_{18}$ toward the black state $P_{19}O_{18}$. Another negative pulse does not change this new state. In the absence of a pulse, the two bright or black quasi-uniform textures of the pixel are stable for several hours.

b) Dynamics of the Switching

Figure 7:
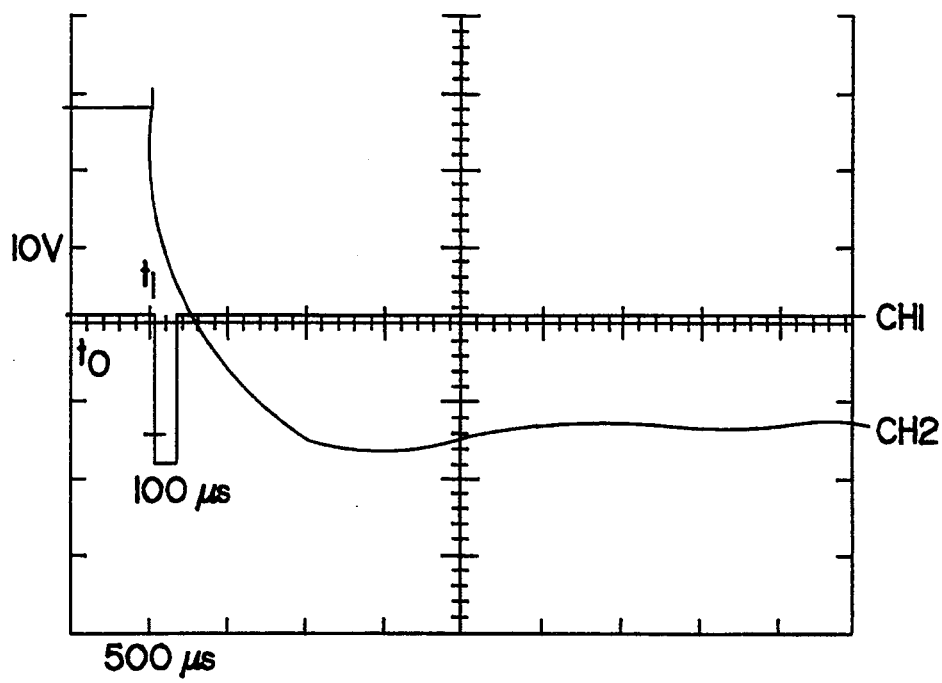
FIG. 7 represents a typical recording of light transmitted through a cell according to the present invention following the application of a command pulse operating a switching of stable configurations.

FIG. 7 shows a typical recording of the light transmitted through the cell. At the origin to of the recording, the cell is in the state $O_{19}P_{18}$ which transmits light. A −18 volt pulse of duration $\tau$ is applied at t1. The light starts to fall at the start of the pulse and then continues for t=1 ms, in order finally to give the black state $O_{18}P_{19}$. t is the well-known characteristic time of orientation of the bulk curvature, in the absence of an electric field. t is defined by: $t^{-1} = K/d^2 \eta$ where K is the constant of curvature of the nematic $K \simeq 10^{-6}$ cgs) and $\eta$ the viscosity ($\eta \simeq 0.1$ cgs). t varies as the square of the thickness d.

Figure 8:
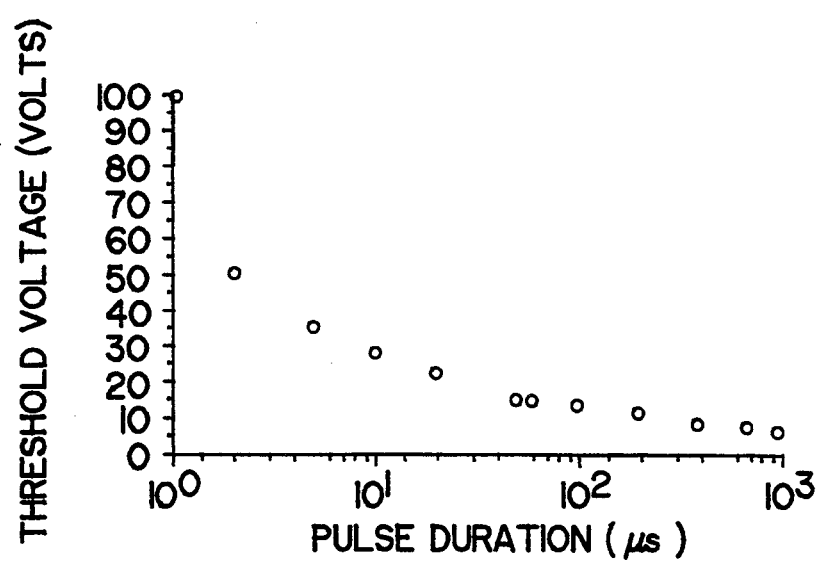
FIG. 8 represents the command pulse threshold voltage as a function of the pulse duration for a display of 1 $\mu$m thickness.

The inventors have measured the flipping threshold $V(\tau)$. The curvature in FIG. 8 is obtained. For infinite $\tau(\tau \simeq 1 \text{ ms})$, V saturates toward $\pm 7.5$ volt. For shorter $\tau$, it is necessary to increase V. It is found for example for $\tau = 64$ μs (the access time of a line, for a video image with 625 lines) that V=15 volt. For a 1000 line film speed, we have $\tau = 40$ μs and V=16 volt. $\tau = 1$ μs may be obtained for V=100 volt. These thresholds are the same for the two switchings, bright-black and black-bright, between the two states.

c) Modelling

The inventors have measured the threshold field V(96)/d for various thicknesses d between 1 and 4 μm.

Figure 9:
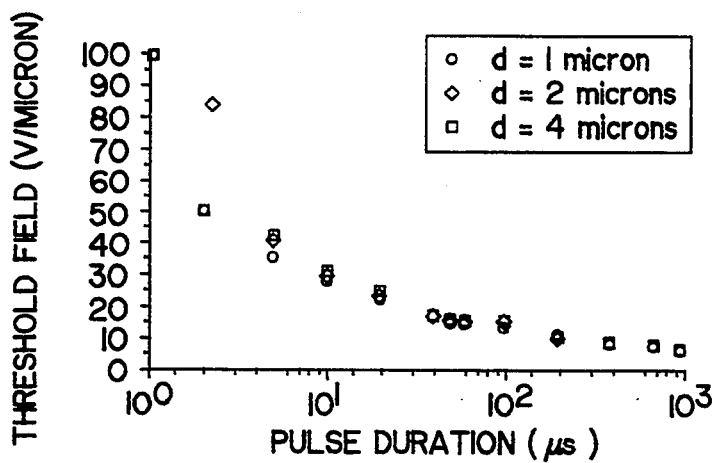
FIG. 9 represents the command threshold field as a function of the pulse duration for cells of variable thickness, FIG. 10 diagrammatically represents a first example of command signals and of control signals according to the present invention, FIG. 11 diagrammatically represents a second example of command signals and of control signals according to the present invention.

The curve obtained is represented in FIG. 9.

For large $\tau(>100$ μs), the threshold V/d is constant, indicating that an electric field effect is being observed. With short times ($\tau < 20$ μs, an increase in the switching field, itself proportional to the thickness, is observed.

The switching mechanism is the following: the field effect at large $\tau$ corresponds to the breaking of the surface orientation. The field E tends to align the nematic normal to the electrodes (homeotropic orientation) because of the positive electric [sic] anisotropy of the crystal. By symmetry, this state is an extremum of the surface energy. Defining the surface energy barrier between the two states by the extrapolation length L (0.1 μm < L < 1 μm), this critical field is obtained when the dielectric couple applied to the surface just compensates for the return couple of the surface orientation.

This gives the relationship:

$$\frac{K}{L}\theta = \left(\frac{\epsilon a}{4\pi}E^2\right)\theta\zeta \quad (1)$$

where $\zeta$ is the electrical coherence length defined by:

$$\frac{K}{\zeta^2} = \frac{\epsilon a}{4\pi}E^2 \quad (2)$$

i.e.

$$\zeta = \left(\frac{4\pi K}{\epsilon a}\right)^{\frac{1}{2}}\frac{1}{E} \quad (3)$$

We finally obtain $\zeta = L$. With V=7.5 volt, it is found that L=$(10^{-3}/E)$=5 $10^{-6}$ cm≈500Å, which corresponds to very strong anchoring.

At the end of the pulse, the homeotropic texture will again give at random one of the two textures $O_{19}P_{18}$ or $O_{18}P_{19}$. The degeneracy is raised by the flexoelectric coupling between the textures and the depolarizing field of the ions blocked at the surface.

Let us, for example, take for the explanation, the case of a negative pulse which causes switching from $O_{19}P_{18}$ toward $O_{18}P_{19}$. Just after the pulse, if the charges which determined the applied voltage V are removed from the electrodes, there remain near the top electrode 19 positive ions and near the bottom electrode 18 negative ions, which apply a depolarizing and transient electric field $E_d$ from 19 toward 18. This field promotes the creation of the $P_{19}O_{18}$ state which has a flexoelectric polarization $P_z$ also directed from 19 toward 18 with, therefore, an energy $-P_zE_d$ which is favorable. The $P_{18}O_{19}$ state has an energy $+P_zE_d$ which is unfavorable.

After the relaxation time of the charges, the field $E_d$ disappears and the $P_{19}O_{18}$ state is stable, although having the same energy as the $P_{18}O_{19}$ state, because the system alone cannot get over the strong surface anchoring barrier.

With short times, it is necessary to increase V faster than the thickness, because another constraint appears: the ions must have the time to be transported during the pulse $\tau$ from one electrode to the other.

Calling $\mu$ ($\mu \approx 10^3$ μm$^2$/Vs) the mobility of the ions, their speed v is $v = \mu E$. A time of $\tau' = d/v = d^2/\mu V \approx 130$ μs is required in order to cover d=1 μm with V=7.5 volt. Taking this transport condition as the only limitation, it is found that V/d=E≈d/μτ', which is indeed proportional to d as found experimentally.

If the two textures $O_{19}P_{18}$ between which the switching is made had exactly the same energy, an infinitesimal depolarizing field would be sufficient in order to provide the switching. In fact, the two textures are not exactly symmetric and have an energy difference $\Delta W$. The minimum depolarizing field $E_d$ necessary is then that which gives a flexoelectric coupling energy $\int -E_d P d^3 r$ greater than $|\Delta W|$. In practice, $\Delta W$ is not known. $E_d$ is adjusted by doping the nematic with ions. For 5CB, we have measured a resistance R of the sample with cross section S=1 cm$^2$ and d=1 μm of R=1 to 10MΩ, depending on the initial purity of the product. In order to increase the surface charges and the depolarizing field, we doped 5CB with TBATPB (tetrabutylammonium tetraphenylborate) in order to obtain a final relative molar ion concentration of $10^{-3}$ to $10^{-5}$. We obtain the bistable effect within a range of sample resistance R=25kΩ to 1MΩ. In practice, the initial conductivity of the least resistant samples is sufficient to provide the effect for the surface states which we used.

The bistable display thus formed on a pixel may be utilized in multiplexed matrix screens. The surface time then defines the access time of the lines, and the bulk time that of the images. In the absence of time constraint, the bistability of course allows infinite multiplexing. In the presence of time constraint, it is possible to transmit a maximum number $1/\tau v$ of 1000 images/sec. The number of lines of these images is defined by the voltage used: 16 volt for 1000 lines at the video film speed for example (and 15 volt for 625 lines). This system is therefore well adapted to the high-definition video display arrangement.

VARIANT OF IMPLEMENTATION OF THE CONTROL SIGNALS

1. Reminder of the Previously Described Embodiment

A method of control of the display was previously described which consists in applying onto the device a square electric pulse of amplitude V (1 volt < V < 100 volts) and of duration $\tau$ (1 μs < $\tau$). This pulse orientates the bulk molecules normally to the electrodes (homeotropic orientation) and also breaks the surface orientation on the electrodes.

At the end of the pulse, the system can return to one of two stable textures corresponding to different flexoelectric polarizations. The two stable textures are called A or B in what follows. In fact, the system does not return at random. The final chosen texture depends on the polarity of the pulse applied.

If the system is in the state A, a positive pulse for example, of voltage $|V| > V_s(\tau)$ or make it pass into the state B.

The application of another identical voltage of the same polarity leaves the system in the state B.

The application of a negative pulse $-V$ ($|V| > V_s(\tau)$) flips the system back into the state A. $V_s(\tau)$ is a threshold voltage dependent on $\tau$.

The polarity of the effect is explained by the coupling between the flexoelectric polarization of the states A and B and the residual field in the cell when the pulse has Just been cut.

If the charges are removed from the electrodes, this residual field is the depolarizing field created by the ions present in the cell, after doping, or not, of the nematic.

In practice, the voltage at the terminals of the cell is cancelled abruptly. There then remain charges out of equilibrium not only near the electrodes (the ions), but also on the electrodes. The field distribution in the cell is more complex, but the sign of all the fields and of all the residual charges is strictly linked to the sign of the electric pulse V applied.

The overall flexoelectric coupling of the residual field due to the ions out of equilibrium near the electrodes and of the flexoelectric polarizations of the nematic (and more generally of the depolarizing field gradients and of the electric quadruple moments of the nematic) always promotes the return of the system toward that of the states A or B whose energy in the transient regime is the lowest, taking into account the sign of the command pulse.

2. Subject of the Variant

The improvements made by the present variant relate to the transient phase of return to equilibrium when, after the surface orientation is broken, the system has the choice of returning toward one of the two states A or B.

It may appear that in practice, dependence on the concentration of the ions in the cell for providing the switching toward one of the two states A or B desired involves difficulties.

In order better to control this return, independently of the ions present in the cell, the inventors propose, as previously indicated, successive application to the device of: 1) at least one command pulse capable of inducing a generally homeotropic homogeneous orientation of the liquid crystal, then 2) a control pulse, of lower amplitude than the command pulse, and of polarity chosen according to the required final state.

Figure 10:
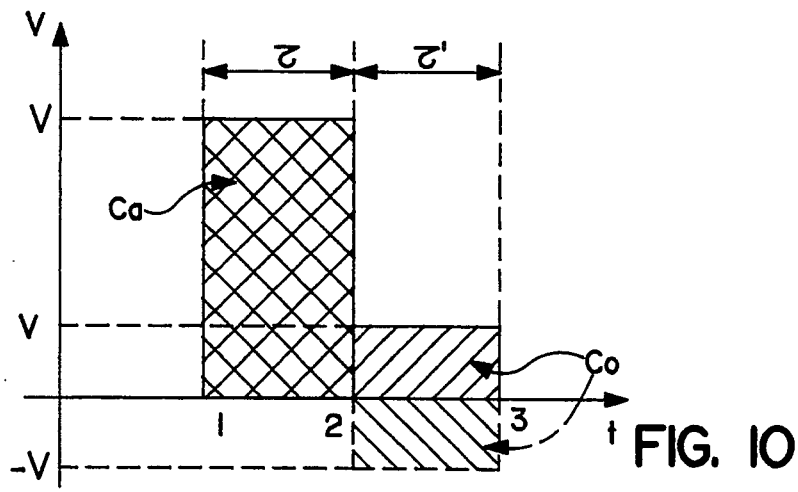

Art example of such successive command and control signals is represented in the attached FIG. 10.

This FIG. 10 shows a square command pulse Ca of voltage V ($|V|>V_s(\tau)$ as previously described applied at time 1.

The command pulse Ca ends at time 2. It lasts for time $\tau$.

According to the present invention, the command pulse Ca is now followed by a second pulse Co: called a control pulse, of amplitude $\pm v$ with 0.1 volt $\leq |v| \leq |<V_s(\tau)$.

Typically, $|v|$ is of the order of +5 volts.

The control pulse Co is maintained between the times 2 and 3, that is to say during a time $\tau'$ with 10 $\mu s < \tau' < \infty$, typically $\tau'$ is between 25 $\mu s$ and 50 $\mu s$.

The control pulse Co allows the polarity of the field in the cell to be controlled between the instants 2 and 3 when the system will switch from the homeotropic homogeneous orientation obtained by the command pulse Ca of amplitude V at the instant 2, toward one of the states A or B of defined polarity.

By using an excitation with two successive, respectively command Ca and control Co, pulses, as indicated in FIG. 10, the following effects are seen.

Let us assume the system to be in the state A, such that the application of a positive command pulse Ca of amplitude V makes it pass into B, in the absence of control pulse v, as previously indicated.

The application of a control pulse Co of amplitude $v > 0$ with $v > v_s(\tau')$ ($v_s$ (50 $\mu s$)=3 volts) inhibits the flipping from A toward B. The system remains in A.

Conversely, the application of a negative control pulse Co $-v$ (whatever its amplitude), always promotes the flipping from A toward B.

In a symmetric manner, for a zero control pulse Co $v=0$, it is necessary to apply a command voltage $V<0$ in order to switch from V toward A. A positive control voltage Co $v<0$ always promotes the flipping from B toward A, whatever its amplitude. In contrast, a negative control voltage Co $-v<0$ ($|v|>v_s(\tau')$ as previously) prevents the flipping from B toward A.

Finally, the state obtained after return to equilibrium depends only on the polarity of the control pulse Co if the amplitude v of this control pulse Co is chosen above the threshold $|v_s| \sim 3$ volts, and does not depend on the polarity of the command pulse Ca.

The means proposed by the present invention therefore allow the functions to be separated: the command pulse Ca of amplitude V breaks the surface orientation, and the control pulse Co of amplitude v ($|v|>v_s(\tau')$) controls by its sign the polarity of the final stage A or B. The threshold $v_s(\tau')$ of the control pulse Co corresponds to the compensation by this pulse v for the polarity controlled by the ions. This threshold $v_s$ falls when taking a liquid crystal which is less conductive. $v > v_s(\tau')$ means that the control pulse has an effect greater than the depolarizing field of the ions. The switching table obtained is given in FIG. 12 in which the useful states ($|v|>v_s(\tau')$) are indicated in bold, and in which it has been assumed that $|V|>V_s(\tau)$.

Figures 12, 13:
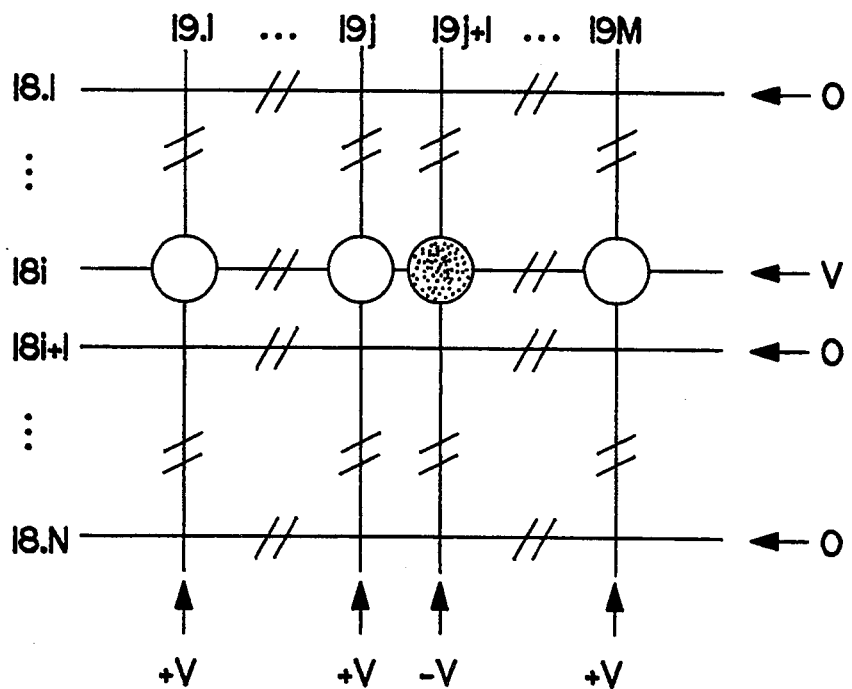
FIG. 12 represents in tabular form the various states obtained as a function of the command and control signals applied, and FIG. 13 diagrammatically represents a matrix display controlled by multiplexing according to the present invention.

It is seen on the table in FIG. 12 that if a control pulse Co is chosen of amplitude greater than the threshold (i.e. $|v|>v_s(\tau')$), which corresponds to the states in bold characters, the final state depends only on the sign of the control pulse Co.

The "light-faced" states illustrated on the table in FIG. 12 correspond to the operation previously described with reference to FIGS. 1 to 9.

APPLICATION TO THE MULTIPLEXING OF A BISTABLE NEMATIC DISPLAY

The aforementioned means allow simple control of the display, by multiplexing.

Let us assume as diagrammatically represented in FIG. 13, a matrix display comprising N line electrodes referenced 18-1 to 18-N on a first plate and M column electrodes referenced 19-1 to 19-M on the second plate.

Each pixel defined by the intersection of a line electrode and a column electrode is identified by its coordinates i, j.

The method of multiplexing according to the present invention is the following.

Each line 18-1 to 18-N, for example the line i, is opened in succession by exciting it with a command voltage Ca of amplitude $V(|V|>V_s(\tau))$ of arbitrary polarity. The command pulse Ca is applied onto the line i, according to the diagrammatic illustration in FIG. 13, the other lines receive no signal ($V=0$). At the end of the excitation by the command pulse V, the whole of the line i is erased, the molecules of the liquid crystal take a homeotropic orientation.

Control pulses Co of amplitude $\pm |v|(v>v_s(\tau'))$ are then sent in parallel onto all the columns M simultaneously, according to the desired state of the various pixels i, J ($1 \leq j \leq M$) of the line i. The control pulses Co of amplitude $\pm v$ are applied just at the end of the command pulse Ca of amplitude V. The pixels i, J ($1 \leq j \leq M$) of this line are then placed in the states A or B, depending on the sign of the small control pulse v. The other lines which are not open (V=0) are insensitive to the control pulse Co and keep their states A or B. For greater convenience, the application of the control pulse Co could be started before the end of the command pulse Ca. The requirement is that the control pulse Co persists 10 to 50 $\mu$s after the end of the command pulse Ca.

After the line i, the lines i+1, i+2, etc., will be opened in succession, which lines will be erased and rewritten, in order to draw the new image. Each line is therefore erased in succession by a command pulse Ca of amplitude V during the time $\tau$, and rewritten by a control pulse Co of amplitude v during the time $\tau'$ which succeeds $\tau$. The total time for erasing and rewriting a line is therefore, according to the aforementioned method: $\tau + \tau'$, adjustable by varying the command pulse Ca and the control pulse Co. The total time for erasing and rewriting a complete image is then $N(\tau + \tau')$.

However, the line i+1 may advantageously be opened with a command pulse Ca during the time $\tau'$ of writing of the preceding line i with control pulses Co. The total time for writing a complete image is then only $N \times \tau$ instead of $N(\tau + \tau')$.

Figure 11:
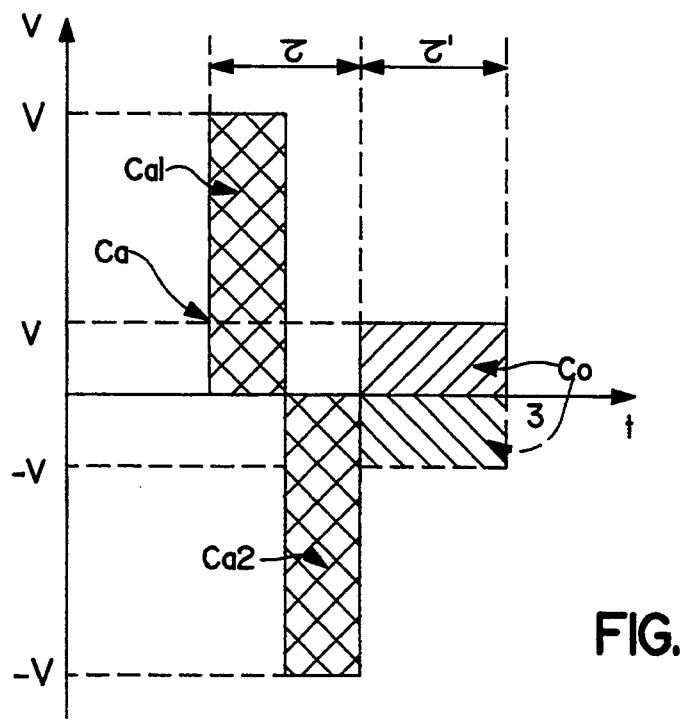

In order to avoid the electrochemical effects, it is possible to alternate the sign of the command pulse V from one image to the other, or even replace the command pulse Ca of continuous amplitude V by a command pulse Ca of high-frequency amplitude V. Such a high-frequency command pulse is represented diagrammatically in the form of two successive pulses Ca1, Ca2 of opposite polarities, in FIG. 11. In the case of a high-frequency excitation, the threshold $v_s$ of the control pulse Co is zero since there is no longer any polar memory of the ions. The amplitude v of the control pulse Co could be diminished. The absolute polarity of the states A and B depends on the sign of the flexoelectric constant of the nematic and of the angles of obliqueness of orientation on each electrode. It is of no importance in the operation of the display, since it is sufficient to change the sign of the control pulse Co in order to promote one state or the other.

In conclusion, the bistable nematic display system, with flexoelectrically controlled surface bistability, may be multiplexed very simply by virtue of the means proposed by the present variant.

For this purpose, each line electrode is sequentially excited by a continuous command pulse Ca of amplitude V between 1 and 100 volts, typically 10 and 20 volts of duration greater than 1 $\mu$s, typically between 20 and 50 $\mu$s, of arbitrary sign, or even a high-frequency pulse, which breaks the surface orientation and erases the line.

Just after the command pulse Ca, a control pulse Co of an amplitude v between 0.1 and 10 volts, typically of the order of 5 volts of duration greater than 10 $\mu$s, typically between 25 and 50 $\mu$s, is applied in parallel onto all the columns. If the amplitude v of the control pulse Co is greater than the threshold required, (i.e. $|v| > v_s(\tau')$ of the order of 3 volts), the final state of the pixels depends only on the polarity of the control pulse Co.

The amplitude threshold $v_s$ of the control pulse Co is zero for a high-frequency command excitation. In practice, a control pulse Co having an amplitude of the order of 0.1 volt may then be taken.

The sequential excitation of the lines is continued in order to scan the whole image.

This method of multiplexing according to the present invention is much simpler than those previously proposed for the multiplexing of the smectic C* ferroelectric smectics. For these latter, in fact, use is generally made of, in addition to an erasing pulse, a double write pulse, all these pulses (4 for example), being high-voltage pulses. The method according to the present invention uses only one "high" command voltage V, and a low control voltage $\pm v$.

It will be noticed that the device according to the present invention presents no problem of electrochemical stability inasmuch as the cholesteric dopants possible used are electrochemically stable.

The invention is, of course, not limited to the particular embodiments which have just been described, but encompasses all variants in accordance with its spirit.

We claim:

1. Bistable-effect liquid crystal optical device comprising two transparent plates provided with control electrodes and between which there is placed a nematic liquid crystal material wherein the transparent plates have on inside surfaces a surface treatment for defining two stable configurations of liquid crystal material molecules on said inside surfaces of the transparent plates, said two stable configurations having different azimuthal orientations and different zenithal orientations with respect to said transparent plates so as to generate two flexoelectric polarizations having components normal to the electrodes and of opposite directions, and there are provided electrical supply means for applying to the device pulses of electric field perpendicular to the plates and oriented selectively in one direction or the other.

2. Device according to claim 1, characterized in that the nematic liquid crystal has a positive dielectric anisotropy.

3. Device according to claim 1, characterized in that the nematic liquid crystal has a positive dielectric anisotropy which is approximately equal to 10.

4. Device according to claim 1, characterized in that the two stable configurations of molecules of the liquid crystal material correspond to liquid crystal textures with a constant azimuth for a given configuration and an offset in azimuth from one configuration to the other.

5. Device according to claim 4, characterized in that the two stable configurations of molecules of the liquid crystal material correspond to textures offset by 45° to each other.

6. Device according to claim 1, characterized in that one of the two stable configurations of molecules of the liquid crystal material corresponds to an orientation which is planar on a first plate and oblique on a second plate, and the other corresponds to an orientation which is oblique on the first plate and planar on the second plate.

7. Device according to claim 1, characterized in that the liquid crystal cell comprising the two transparent plates is placed between a polarizer and an analyzer which are crossed.

8. Device according to claim 1, characterized in that liquid crystal material is doped with non-chiral ions.

9. Device according to claim 1, characterized in that the relative molar ion concentration is of the order of $10^{-3}$ to $10^{-5}$.

10. Device according to claim 1, characterized in that the two stable configurations are obtained by different abrasions which are inclined to each other and made on the internal surface of the plates.

11. Optical device according to claim 10, characterized in that two abrasions of a polymer deposited on the plates are at an angle of 45° to each other.

12. Device according to claim 1, characterized in that the two stable configurations are obtained by controlling the thickness and the mean wavelength of the roughness on the internal surface of the plates.

13. Device according to claim 12, characterized in that the configurations are obtained by control evaporation on the plates.

14. Device according to claim 13, characterized in that the directions of evaporation on the two plates are relatively inclined of approximately 45° in azimuth.

15. Device according to claim 12, characterized in that the configurations are controlled by evaporation of SiO under an angle of approximately 74° with a mean thickness of approximately 30Å.

16. Device according to claim 1, characterized in that the liquid crystal material is doped with a cholesteric.

17. Device according to claim 1 wherein the configurations are obtained by control evaporation on the plates, the directions of evaporation on the two plates being relatively inclined of approximately 45° in azimuth, and liquid crystal material is doped with a cholesteric the cholesteric defining a spontaneous rotation of the nematic liquid crystal material in an inverse direction to an offset formed between the two directions of evaporation on the two respective plates and of amplitude of approximately half the azimuthal offset between the two evaporation directions.

18. Device according to claim 1, characterized in that the thickness of the cell is of 1.3 μ.

19. Device according to claim 1, characterized in that the electrical supply means are for applying command pulses of a duration between 1 and 1000 μs.

20. Device according to claim 1, characterized in that the electrical supply means are for applying to apply command pulses of an amplitude between 1 and 100 volt.

21. Device according to claim 1, characterized in that the electrical supply means are for applying to the device in succession:
at least one command pulse for inducing a generally homeotropic homogeneous orientation of the liquid crystal, then
a control pulse, of amplitude less than the command pulse, and of a polarity chosen according to the required final state.

22. Device according to claim 21, in which the control electrodes are arranged in N lines and M columns defining a matrix of NM pixels at their intersections, characterized in that the command pulses are applied successively onto the N line electrodes, while at the end of each command pulse, control pulses of respectively chosen polarity are applied simultaneously onto the whole of the M column electrodes.

23. Optical device according to claim 22, characterized in that the start of the command pulse on the line electrode i+1 coincides substantially with the end of the command pulse on the line electrode i.

24. Optical device according to claim 21, characterized in that the command pulse is a single square pulse.

25. Optical device according to claim 21, characterized in that the command pulse comprises successive square pulses of opposite polarities.

26. Optical device according to claim 21, characterized in that the command pulse comprises a high-frequency pulse train.

27. Optical device according to claim 21, characterized in that the amplitude of the command pulses is between 1 and 100 volts.

28. Optical device according to claim 27, characterized in that the amplitude of the command pulses is between 10 and 20 volts.

29. Optical device according to claim 21, characterized in that the duration of the command pulses is greater than 1 μs.

30. Optical device according to claim 29, characterized in that the duration of the command pulses is between 20 and 50 μs.

31. Optical device according to claims 21, characterized in that the amplitude of the control pulses is between 0.1 and 10 volts.

32. Optical device according to claim 31, characterized in that the amplitude of the control pulses is between 0.1 and 5 volts.

33. Optical device according to claim 21, characterized in that the duration of the control pulses is greater than 10 μs.

34. Optical device according to claim 33, characterized in that the duration of the control pulses is between 25 and 50 μs.

35. Optical device according to claim 21, characterized in that the start of the control pulses coincides with the end of the command pulses.

36. Optical device according to claim 21, characterized in that the start of the control pulses precedes the end of the command pulses).

37. Optical device according to claim 21, characterized in that the control pulses persist after the end of the command pulses for at least 10 μs to 50 μs.

38. Bistable-effect liquid crystal optical device comprising two transparent plates provided with control electrodes and between which there is placed a nematic liquid crystal material wherein,
the transparent plates have on inside surfaces a surface treatment for defining two stable configurations of liquid crystal material molecules, said two stable configurations having a constant azimuth for a given configuration, an offset in azimuth from one configuration to the other, and different zenithal orientations with respect to said transparent plates; one of the two stable configurations of molecules of the liquid crystal material corresponding to an orientation which is planar on a first plate and oblique on a second plate and the other corresponding to an orientation which is oblique on the first plate and planar on the second plate, so as to generate two flexoelectric polarizations having components normal to the electrodes and of opposite directions, and
there are provided electrical supply means for applying to the device pulses of electric field perpendicular to the plates, oriented selectively in one direction or the other.

39. Bistable-effect liquid crystal optical device comprising two transparent plates provided with control electrodes and between which there is placed a nematic liquid crystal material wherein, the transparent plates have on inside surfaces a surface treatment for defining two stable configurations of liquid crystal material molecules, said two stable configurations having different azimuthal orientations and different zenithal orientations with respect to said transparent plates so as to generate two flexoelectric polarizations having components normal to the electrodes and of opposite directions, and there are provided electrical supply means for applying to the device in succession at least one command pulse for inducing a generally homeotropic orientation of the liquid crystal, then a control pulse of amplitude less than the command pulse, and of polarity chosen according to the required final state.

40. Bistable-effect liquid crystal optical device comprising two transparent plates provided with control electrodes and between which there is placed a nematic liquid crystal material wherein, the transparent plates have on inside surfaces a surface treatment for defining two stable configurations of liquid crystal material molecules, said two stable configurations having different azimuthal orientations and different zenithal orientations with respect to said transparent plates so as to generate two flexoelectric polarizations having components normal to the electrodes and of opposite directions, and there are provided electrical supply means for applying to the device in succession at least one command pulse comprising a high frequency pulse train for inducing a generally homeotropic orientation of the liquid crystal, then a control pulse of amplitude less than the command pulse, and of polarity chosen according to the required final state.

41. Bistable-effect liquid crystal optical device comprising two transparent plates provided with control electrodes and between which there is placed a nematic liquid crystal material wherein, the transparent plates have on inside surfaces a surface treatment for defining two stable configurations of liquid crystal material molecules, said two stable configurations having a constant azimuth for a given configuration, an offset in azimuth from one configuration to the other, and different zenithal orientations with respect to said transparent plates; one of the two stable configurations of molecules of the liquid crystal material corresponding to an orientation which is planar on a first plate and oblique on a second plate, and the other corresponding to an orientation which is oblique on the first plate and planar on the second plate, so as to generate two flexoelectric polarizations having components normal to the electrodes and of opposite directions, and there are provided electrical supply means for applying to the device in succession at least one command pulse for inducing a generally homeotropic orientation of the liquid crystal, then a control pulse of amplitude less than the command pulse, and of polarity chosen according to the required final state.

42. Bistable-effect liquid crystal optical device comprising two transparent plates provided with control electrodes and between which there is placed a nematic liquid crystal material wherein, the transparent plates have on inside surfaces a surface treatment for defining two stable configurations of liquid crystal material molecules, said two stable configurations having a constant azimuth for a given configuration, an offset in azimuth from one configuration to the other, and different zenithal orientations with respect to said transparent plates; one of the two stable configurations of molecules of the liquid crystal material corresponding to an orientation which is planar on a first plate and oblique on a second plate, and the other corresponding to an orientation which is oblique on the first plate and planar on the second plate, so as to generate two flexoelectric polarizations having components normal to the electrodes and of opposite directions, and there are provided electrical supply means for applying to the device in succession at least one command pulse comprising a high frequency pulse train for inducing a generally homeotropic orientation of the liquid crystal, then a control pulse of amplitude less than the command pulse, and of polarity chosen according to the required final state.

* * * * *